United States Patent
Hagvall et al.

(10) Patent No.: US 12,479,448 B2
(45) Date of Patent: Nov. 25, 2025

(54) CONTROL SYSTEM FOR A VEHICLE

(71) Applicant: Volvo Truck Corporation, Gothenburg (SE)

(72) Inventors: Linus Hagvall, Gothenburg (SE); Emil Klintberg, Torslanda (SE); Wilhelm Wiberg, Askim (SE)

(73) Assignee: Volvo Truck Corporation, Gothenburg (SE)

( * ) Notice: Subject to any disclaimer, the term of this patent is extended or adjusted under 35 U.S.C. 154(b) by 511 days.

(21) Appl. No.: 17/777,392

(22) PCT Filed: Dec. 9, 2019

(86) PCT No.: PCT/EP2019/084219
§ 371 (c)(1),
(2) Date: May 17, 2022

(87) PCT Pub. No.: WO2021/115552
PCT Pub. Date: Jun. 17, 2021

(65) Prior Publication Data
US 2022/0402513 A1 Dec. 22, 2022

(51) Int. Cl.
*B60W 50/029* (2012.01)
*B60W 50/02* (2012.01)

(52) U.S. Cl.
CPC ...... *B60W 50/029* (2013.01); *B60W 50/0205* (2013.01); *B60W 2050/0292* (2013.01);
(Continued)

(58) Field of Classification Search
CPC ........... B60W 50/029; B60W 50/0205; B60W 2050/0292; B60W 2420/403;
(Continued)

(56) References Cited

U.S. PATENT DOCUMENTS 6,084,398 A * 7/2000 Howard ................. H02P 6/182
310/68 B
2009/0256517 A1 * 10/2009 Baglino ................. H02P 21/04
318/772

(Continued)

FOREIGN PATENT DOCUMENTS

CN 105264450 A 1/2016
CN 105848981 A 8/2016
(Continued)

OTHER PUBLICATIONS

Simple Electric Motor, Motor With Optical Control, 2018, simplemotor.com, pp. 1-2 (Year: 2018).*

(Continued)

*Primary Examiner* — Aniss Chad
*Assistant Examiner* — Chase L Cooley
(74) *Attorney, Agent, or Firm* — Withrow & Terranova, PLLC

(57) ABSTRACT

The present disclosure relates to a control system for selectively controlling a vehicle, ensuring high integrity of decisions taken by the control system when controlling the vehicle. The present disclosure also relates to a corresponding computer implemented method and to a computer program product.

17 Claims, 3 Drawing Sheets

(52) U.S. Cl.
CPC . *B60W 2420/403* (2013.01); *B60W 2420/408* (2024.01); *B60W 2420/54* (2013.01); *B60W 2520/06* (2013.01); *B60W 2520/105* (2013.01); *B60W 2520/14* (2013.01)

(58) Field of Classification Search
CPC ....... B60W 2420/408; B60W 2420/54; B60W 2520/06; B60W 2520/105; B60W 2520/14; B60W 50/023; G05B 2219/24177; G05B 2219/24182; G05B 2219/2637; G05B 19/0425
See application file for complete search history.

(56) References Cited

U.S. PATENT DOCUMENTS

| | | | |
|---|---|---|---|
| 2014/0074313 A1 | 3/2014 | Cox et al. | |
| 2014/0277608 A1 | 9/2014 | Debouk et al. | |
| 2015/0191169 A1* | 7/2015 | Fairgrieve | B60W 30/143 |
| | | | 701/93 |
| 2016/0063870 A1 | 3/2016 | Scheidt | |
| 2019/0163179 A1 | 5/2019 | Vieux | |

FOREIGN PATENT DOCUMENTS

| | | |
|---|---|---|
| CN | 107089205 A | 8/2017 |
| DE | 102017112183 A1 | 12/2018 |
| DE | 102017209720 A1 | 1/2019 |
| WO | 2018237121 A1 | 12/2018 |
| WO | 2018237121 A9 | 12/2018 |

OTHER PUBLICATIONS

Alegre, S. et al., "Modelling of electric and parallel-hybrid electric vehicle using Matlab/Simulink environment and planning of charging stations through a geographic information system and genetic algorithms," Renewable and Sustainable Energy Reviews, vol. 74, Mar. 2017, Elsevier Ltd., 8 pages.

Jackson, N., "Infographic: How Does a Hybrid Car Engine Actually Work?" The Atlantic, Jun. 30, 2011, 4 pages.

International Search Report and Written Opinion for International Patent Application No. PCT/EP2019/084219, mailed Jul. 22, 2020, 14 pages.

International Preliminary Report on Patentability for International Patent Application No. PCT/EP2019/084219, mailed Mar. 18, 2022, 25 pages.

First Office Action for Chinese Patent Application No. 201980102801. X, mailed Nov. 5, 2024, 19 pages.

Examination Report for European Patent Application No. 19818028. 3, mailed Feb. 11, 2025, 17 pages.

* cited by examiner

CONTROL SYSTEM FOR A VEHICLE

This application is a 35 USC 371 national phase filing of International Application No. PCT/EP2019/084219, filed Dec. 9, 2019, the disclosure of which is incorporated herein by reference in its entirety.

TECHNICAL FIELD

The present disclosure relates to a control system for selectively controlling a vehicle, ensuring high integrity of decisions taken by the control system when controlling the vehicle. The present disclosure also relates to a corresponding computer implemented method and to a computer program product.

BACKGROUND

Recently there have been great advances in the semi and fully autonomous operation of a vehicle, effectively providing driver assistance and safety functions, such as adaptive cruise control, pedestrian detection, front and rear collision warning, lane departure warning and general obstacle detection. Such a vehicle typically makes use of a plurality of sensors that are configured to detect information about an environment surrounding the vehicle.

Since semi and fully autonomous vehicle control inherently lacks human redundancy, it is necessary to implement the vehicle control in such a manner that it is possible to guarantee that an accident risk is kept at a tolerable level and at the same time ensure a high integrity. Prior-art implementations typically handle this by utilizing redundant controllers to ensure that safe operation may be continued also in situations where a portion of the system or sensors fail.

An example of such an implementation is presented in US20140277608, disclosing a fault tolerant controller system includes a first controller and a second controller. One of the first and second controllers is designated as a primary controller for generating control signals intended to control actuation devices on a vehicle under non-fault operating conditions, and the other of the first and second controllers designated as a secondary controller generating control signals intended to control actuation devices on the vehicle. Initially, the first controller is designated as the primary controller and independently controls the actuation devices. However, if the first controller fails, the second controller is designated as the primary controller and takes over the control of the actuation devices.

A problem with the solution presented in US20140277608 is that it is hard to ensure that the second controller, when taking over as the primary controller in fact works correctly. That is, if e.g. the control signals from the first and the second differs, it is not always sure that any of the controllers in fact provided the correct control signals. To handle such a scenario, further supervising functionality needs to be implemented, resulting in a system is complex and possibly computational inefficient. With the above in mind, it would be desirable to provide a control system where safe control of a semi and fully autonomous vehicle is made possible, while at the same time ensuring that the control strategy applied by the control system is efficient without relying on a complex implementation.

SUMMARY

According to an aspect of the present disclosure, the above is at least partly alleviated by control system for selectively controlling an operation of a vehicle, wherein the control system comprises a first control module configured to control the vehicle within a first operational range, a second control module configured to control the vehicle within a second operational range, and a module adapted to monitor the operation of the vehicle, wherein the first operational range is a subset of the second operational range, and the monitoring module is adapted to select the first control module to control the vehicle if the vehicle is operated within the first operational range, and select the second control module to control the vehicle if the vehicle is operated outside of the first operational range.

The overall idea with the present disclosure is to implement a scheme for simplifying how to ensure redundancy, for example when deciding on acting on sensor data when automatically operating a vehicle, the vehicle for example being an autonomous vehicle. In line with the present disclosure, a modular approach is taken, including the use of at least three separate modules. In accordance to the present disclosure, at least two of the modules must (simultaneously) fail for the overall system to fail. Since the overall system is divided into separate and parallelly working modules, each of the modules may be simplified and less complex as compared to prior-art solutions, specifically as compared to a non-modular implementation, e.g. where the complete functionality is implemented in a nested manner.

The expression "operation of the vehicle" should within the context of the present disclosure be interpreted broadly, including any form of operation for manipulating how the vehicle function and/or behave during use and/or when standstill. Such operation may for example include controlling a speed, acceleration, distance/location in relation to e.g. other vehicles or a lane, loading/unloading, etc. The scheme according to the present disclosure is however useful in relation to any form of manipulation of the vehicle where it may be desirable to ensure that the control is provided with some form of redundancy to ensure safe operation of the vehicle.

The simplified implementation made possible by means of the present disclosure, at least in part, relies on the fact that the scheme according to the present disclosure necessary rely on monitoring the operational parameter for controlling a vehicle, for selecting which control module to use. Rather, the present disclosure is implemented in a reactive manner, where the resulting operation of the vehicle instead is monitored for selecting which control module to use for controlling the vehicle.

As such, it will typically not be necessary to monitor intermediate processes within the first and the second control module for determining if they are behaving correctly. Instead, a further module (below sometimes denoted as a monitoring module) is provided for monitor the resulting operation of the vehicle. The monitoring module in turn compare the operational behavior of the vehicle (or component of the vehicle) with a respective operational range defined for each of the first and the second module. As indicated above, the first operational range is a subset of the second operational range.

Within the context of present disclosure, the first operational range is defined as being a subset of the second operational range. An exemplary operational range may for example be defined in relation to at least one of a distance, a velocity, an acceleration, a heading, or a yaw rate. Further definitions are possible and within the scope of the present disclosure. The operational range may typically be dependent on the type of range to control, and/or a desired operation of the vehicle. As such, the range for e.g. a velocity and a heading will likely be different, if the ranges are not normalized (which is possible and within the scope of the present disclosure).

In a possible embodiment of the present disclosure, the first operational range is selected to be +/−20% of the desired operation of the vehicle. Correspondingly, the second operational range may be selected to be +/−40% of the desired operation of the vehicle. The here suggested relation is just exemplary, and other relations are possible and within the scope of the present disclosure, as will be apparent from the discussion here below.

As an example, and in relation to e.g. a velocity of the vehicle, it could be possible to define the second operational range to be between 30-80 km/h. As such, the first operational range is selected within this range, as a sub-range, such as e.g. between 40-60 km/h. Accordingly, if the first control module is unable to control the vehicle within the exemplified velocity range of 40-60 km/h, then the monitoring module will transition the control to the second control module for operating the vehicle, at least as long as the vehicle is operated inside of the second operational range.

Seen form a slightly different perspective, if it is a hard requirement to never go slower than 30 km/h and never higher than 80 km/h, the monitoring module will allow the first control module to be used for controlling the vehicle as long as the vehicle is driving above 40 km/h and below 60 km/h and otherwise it will let the second control module to be in control. This means that in order for the vehicle to go below 30 km/h and above 80 km/h both the first and the second control module will have to fail before the vehicle breaks the hard requirement. Additionally, even if the monitoring module would fail, also the first or second control module will have to fail before the vehicle breaks the hard requirement.

Preferably, the first and the second control module are adapted to generate corresponding first and second operational parameters for controlling the vehicle based on a desired operation of the vehicle. Also, the monitoring module preferably selects the first or second operational parameter for controlling the vehicle based on the selection of control module. Accordingly, the first and the second control module generally receives some form of input dictating how it would be desirable to control the vehicle. In relation to a semi-autonomous vehicle such an input could for example be based on information provided from a driver. In relation to an autonomous vehicle the information could instead be generated by the vehicle "itself", such as based on an operational mission, road signs, road limitations, load limitations, etc., or based on information received from a server arranged remotely from the vehicle.

In some embodiments the control system may comprise an electronic control unit (ECU) adapted to implement the first control module, the second control module and the monitoring module. Such a control unit is adapted to provide the necessary processing means for providing the functionality to control the vehicle in a desirable manner. However, the control system must not necessarily be limited to a single control unit, rather the different module may in some embodiments be implemented using separate control units or by means of other processing circuitry.

The operation of the first and the second control module may in some embodiments, in addition to the desired operation of the vehicle, also be dependent on some form of sensor input. In one embodiment the first control module is adapted to receive data from a first sensor comprised with the vehicle for controlling the vehicle, and the second control module is adapted to receive data from a second sensor comprised with the vehicle for controlling the vehicle. The first and the second sensor may in some embodiments be the same sensor, in other embodiments the first and the second sensor may be different sensors. The first and the second sensor may in some embodiments be implemented as single sensors. However, sensor data may also be generated from a plurality of sensors or as fused sensor data. Possibly, at least one of the first and the second sensor may be included with the control system.

The first/second sensor may in some embodiments comprise at least one of a radar, a LiDAR sensor, an ultrasonic sensor or a camera. Other sensors are however possible and within the scope of the present disclosure and may be dependent on what functionality of the vehicle the control system is implemented to control.

According to another aspect of the present disclosure there is provided a computer implemented method for selectively control an operation of a vehicle using a control system, the control system comprising a first control module configured to control the vehicle within a first operational range, a second control module configured to control the vehicle within a second operational range, and a module adapted to monitor the operation of the vehicle, wherein the first operational range is a subset of the second operational range, and the method comprises the steps of selecting, using the monitoring module, the first control module to control the vehicle if the vehicle is operated within the first operational range, and selecting, using the monitoring module, the second control module to control the vehicle if the vehicle is operated outside of the first operational range. This aspect of the present disclosure provides similar advantages as discussed above in relation to the previous aspect of the present disclosure.

In a preferred embodiment of the present disclosure, the control system is provided as an on-board component of the vehicle, typically further comprising the above-mentioned sensors. The vehicle may in turn be e.g. one of a bus, a truck, a car, or any form of construction equipment or working machine. Since the vehicle may be one of e.g. a construction equipment or a working machine, the expression road as used above should be interpreted broadly, including any dedicated areas where the vehicle is operating. The vehicle may furthermore be at least one of a pure electrical vehicle (PEV) and a hybrid electric vehicle (HEV).

According to a further aspect of the present disclosure there is provided a computer program product comprising a non-transitory computer readable medium having stored thereon computer program means for operating a control system comprised with a vehicle, the control system adapted to control an operation of the vehicle, the control system comprising a first control module configured to control the vehicle within a first operational range, a second control module configured to control the vehicle within a second operational range, and a module adapted to monitor the operation of the vehicle, wherein the first operational range is a subset of the second operational range and the computer program product comprises code for selecting, using the monitoring module, the first control module to control the vehicle if the vehicle is operated within the first operational range, and code for selecting, using the monitoring module, the second control module to control the vehicle if the vehicle is operated outside of the first operational range. Also this aspect of the present disclosure provides similar advantages as discussed above in relation to the previous aspects of the present disclosure.

The computer readable medium may be any type of memory device, including one of a removable nonvolatile random-access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1A:
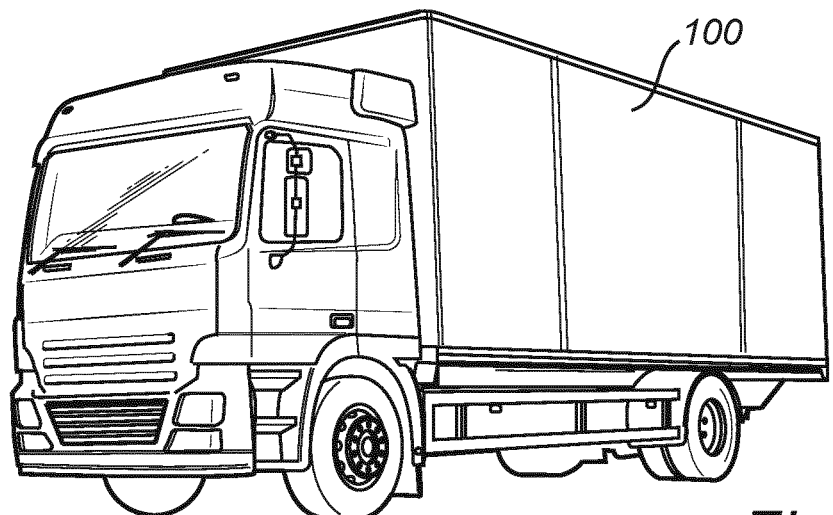
FIG. 1A illustrates a truck, 1B a bus and 1C a wheel loader in which the control system according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1B:
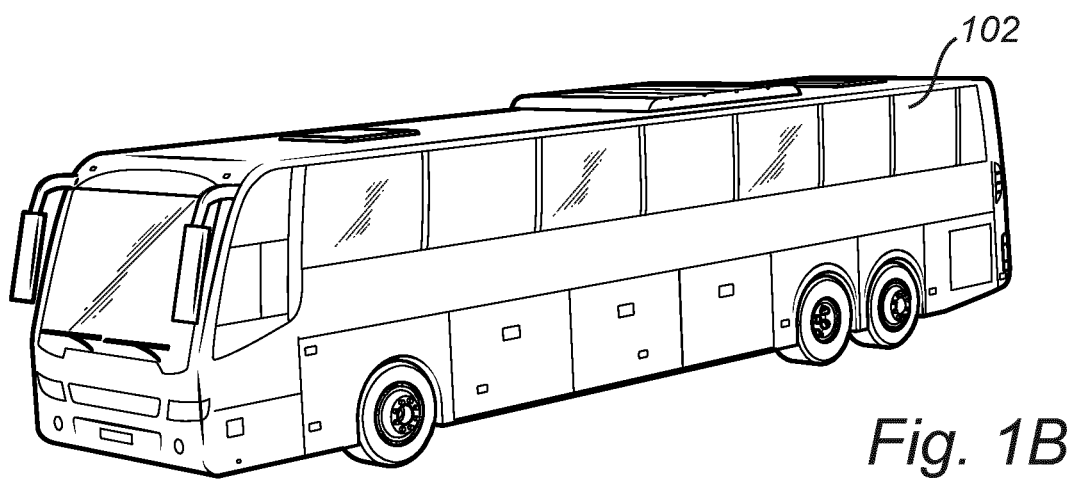
Figure 1C:
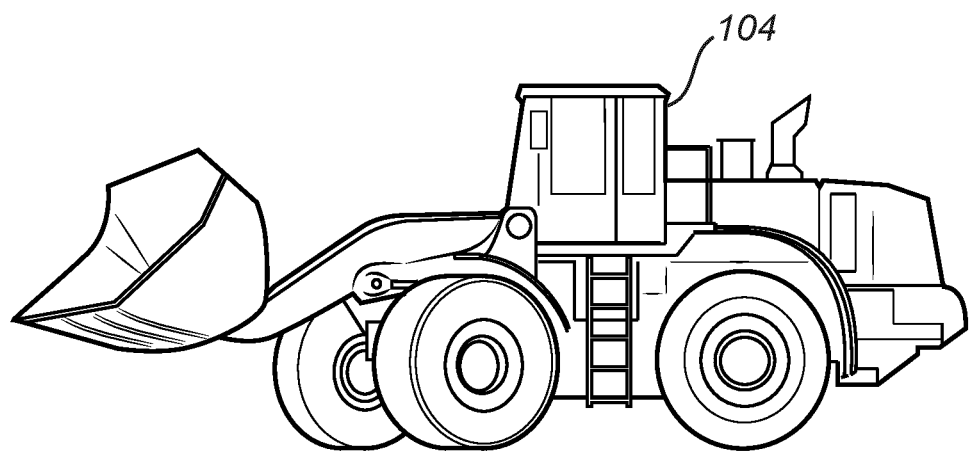
Figure 2:
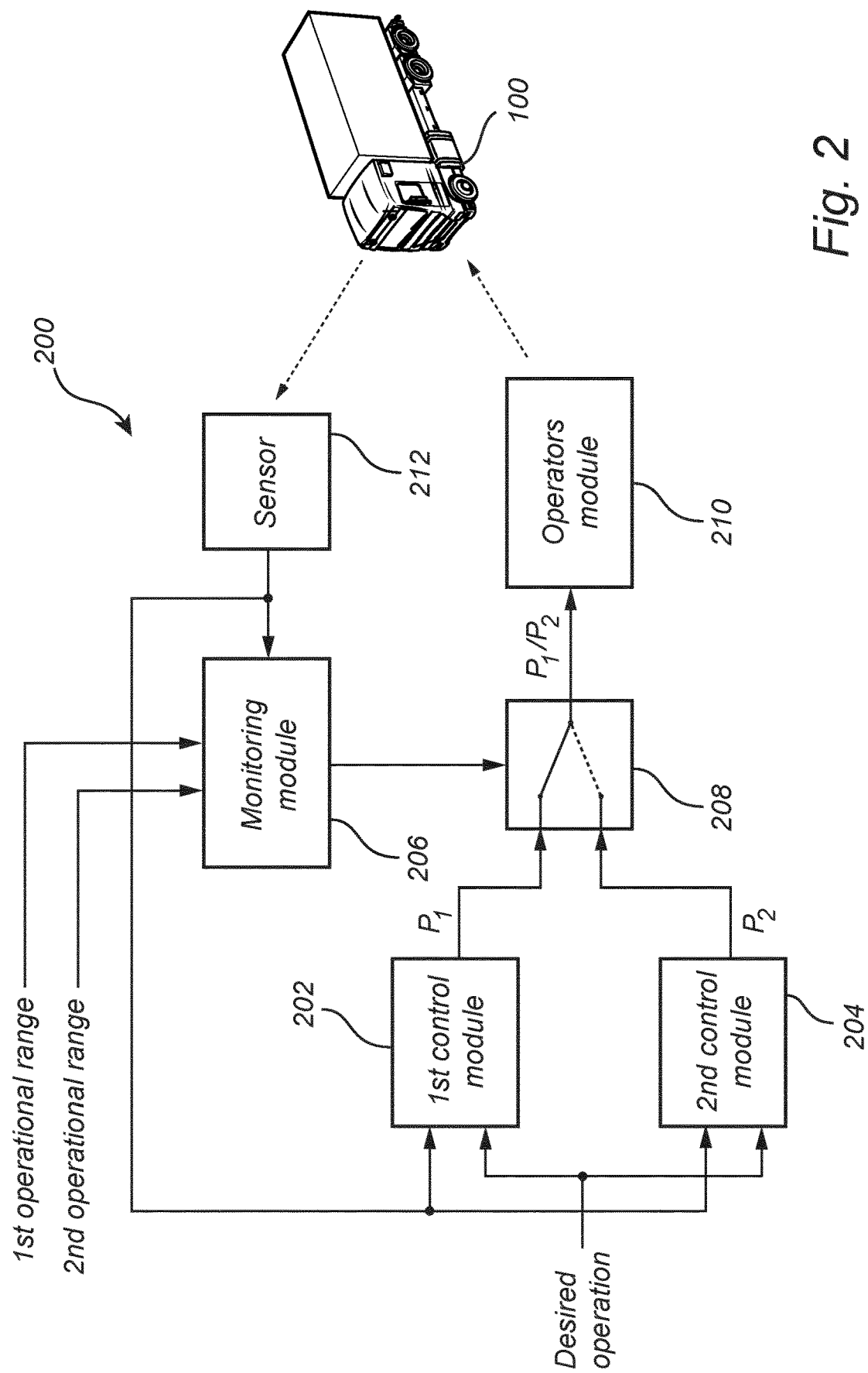
FIG. 2 illustrates a conceptual control system in accordance to a currently preferred embodiment of the present disclosure.

Referring now to the drawings and to FIG. 1A in particular, there is depicted an exemplary vehicle, here illustrated as a truck 100, in which a control system 200 (as shown in FIG. 2) according to the present disclosure may be incorporated. The control system 200 may of course be implemented, possibly in a slightly different way, in a bus 102 as shown in FIG. 1B, wheel loader as shown in FIG. 10, a car, a bus, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

FIG. 2 shows a conceptual and exemplary implementation of the control system 200 according to the present disclosure, typically provided as an onboard component of the vehicle 100, 102, 104. The control system 200 comprises a first 202 and a second 204 control module, where each of the first 202 and the second 204 control module in the illustrated embodiment is configured to form control parameters $P_1$, $P_2$, respectively, to be used for controlling an operation of the vehicle 100, 102, 104.

As mentioned above, operation of the vehicle 102, 104, 106 may include any form of operation for manipulating how the vehicle function and/or behave during use and/or when standstill. Such operation may for example include controlling a speed, acceleration, distance/location in relation to e.g. other vehicles or a lane, loading/unloading, etc. The scheme according to the present disclosure is however useful in relation to any form of manipulation of the vehicle 102, 104, 106 where it may be desirable to ensure that the control is provided with some form of redundancy to ensure safe operation of the vehicle 102, 104, 106. As such, the control parameters from the control modules 202, 204 may take many different forms dependent on what to be controlled within the vehicle 100, 102, 104.

The control system 200 further comprises a monitoring module 206, where the monitoring module 206 is "in charge of" selecting which of the first 202 and the second 204 control module that is used for controlling the vehicle 100, 102, 104. As illustrated in FIG. 2, the monitoring module 206 is arranged in communication with a selection module 208, where the selection module 208 is arranged to control if the control parameter $P_1$ formed by the first control module 202 of the control parameter $P_2$ from the second control module 204 is to be used for controlling the operation of the vehicle 100, 102, 104. In the illustration provided in FIG. 2, the control parameter $P_1/P_2$ is provided to an operations module 210. The operations module 210 may in turn be used for manipulating how the vehicle 100, 102, 104 function and/or behave, as discussed above. As an example, the operations module 210 may be arranged to control a speed of the vehicle 100, 102, 104.

The control system 200 is further adapted to receive a feedback in relation to how the vehicle 100, 102, 104 is operating. Such a feedback may for example be a speed of the vehicle 100, 102, 104 in case the operations module 210 was arranged to control a speed of the vehicle 100, 102, 104. The feedback may for example, as illustrated in FIG. 2, be provided by means of one or a plurality of sensors 212. The feedback may also be represented by a fusion of data from a plurality of sensors.

Furthermore, the control system 200 is also generally adapted to receive an input defining a desired operation of the vehicle 100, 102, 104. In relation to the example with speed control, such an input may be a desired speed of the vehicle 100, 102, 104, for example in relation to a cruise control of the vehicle 100, 102, 104. Such a desired operation may in turn be generated by another control functionality of the vehicle 100, 102, 104, manually or possibly by a remote server (not shown) providing instructions to an autonomous vehicle comprising the control system 200 according to the present disclosure.

The input being representative of the desired operation of the vehicle 100, 102, 104 is provided to the first 202 and the second 204 control module for allowing the control modules 202, 204 to form the control parameter $P_1/P_2$. In some instances, the first 202 and the second 204 control module may each implement a control scheme needing a feedback to function properly (feedback control system, e.g. PID controller). In such instances it may be suitable to also allow the feedback from the one or a plurality of sensors 212 to be provided as an input to the first 202 and the second 204 control module.

For reference, the modules 202, 204, 206, 208 and/or 210 may each be implemented as a separate electronic control unit (ECU). However, some or all of the modules could also share a single ECU. Such an ECU may in turn be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 3:
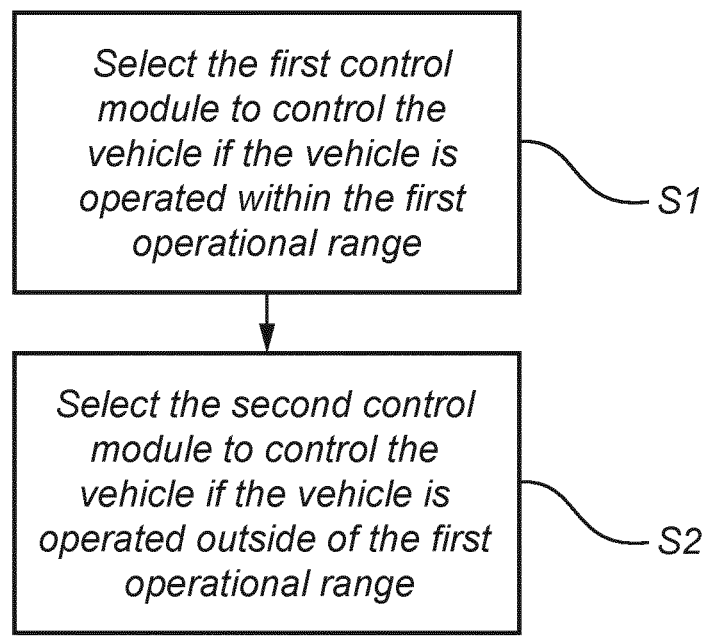
FIG. 3 illustrates the processing steps for performing the method according to the present disclosure.

During operation of the control system 200 for controlling the operation of the vehicle 100, 102, 104, with further reference to FIG. 3, the monitoring module 206 will monitor the resulting operation of the vehicle 100, 102, 104, such as a current speed of the vehicle 100, 104, 104 using the sensor 212. The monitoring module 206 will compare the received resulting operation of the vehicle 100, 102, 104, for example manifested as a value, level, etc. This value/level is in turn compared to a predefined first operational range for the vehicle 100, 102, 104. If the value/level is within the first operational range, the monitoring module 206 will select, S1, the first control module 202 to control the vehicle 100, 102, 104. However, in case the value/level is outside of the first operational range, the monitoring module 206 will select, S2, the second control module 204 to control the vehicle 100, 102, 104.

Accordingly, the second control module 204 will function as a backup for the first control module 202 in case the first control module 202 fails. In accordance to the present disclosure the first operational range is a subset of the second operational range. Furthermore, the second operational range may in accordance to the present disclosure be selected to correspond to a hard requirement for the control of the vehicle.

Thus, again with a reference to the speed control of the vehicle 100, 102, 104, the desired operation of the vehicle 100, 102, 104 may be to drive the vehicle 100, 102, 104 at 50 km/h, however never slower than 30 km/h and never faster than 80 km/h. The second operational range is then selected to be 30-80 km/h. The first operational range being a subset of the second operational range may then be selected to be e.g. 40-60 km/h. As long as the first control module 202 manages to control the vehicle 100, 102, 104 within this first operational range it will be allowed to forward its control parameter $P_1$ to the operations module 210 for controlling the speed of the vehicle 100, 102, 104.

However, if e.g. the sensor 212 generates a speed value outside of the first operational range, the monitoring module 206 will control the selection module 208 to instead forward the control parameter $P_2$ to the operations module 210 for controlling the speed of the vehicle 100, 102, 104. The Following the scheme as defined in line with the present disclosure, it is possible to simplify how to ensure redundancy when deciding on acting on sensor data when automatically operating a vehicle, the vehicle for example being an autonomous vehicle. In line with the present disclosure, a modular approach is taken, including the use of at least three separate modules. In accordance to the present disclosure, at least two of the modules must (simultaneously) fail for the overall system to fail. Since the overall system is divided into separate and parallelly working modules, each of the modules may be simplified and less complex as compared to prior-art solutions, specifically as compared to a non-modular implementation, e.g. where the complete functionality is implemented in a nested manner.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A control system for selectively controlling operation of a vehicle, wherein the control system comprises:
   an electronic control unit (ECU) comprising:
      a first control module configured to control the vehicle within a first operational range,
      a second control module configured to control the vehicle within a second operational range, the second control module redundant to, separate from, and executed in parallel to the first control module the first operational range being a subset of the second operational range, and a monitoring module configured to select between the first control module and the second control module by:

comparing operation of the vehicle with the first operational range, selecting the first control module at the exclusion of the second control module to control the vehicle if the vehicle is operated within the first operational range, and selecting the second control module at the exclusion of the first control module to control the vehicle if the vehicle is operated outside of the first operational range.

2. The control system of claim 1, wherein the second control module is only selected if the vehicle is operated inside of the second operational range.

3. The control system of claim 1, wherein the first and the second control modules are adapted to generate corresponding first and second operational parameters for controlling the vehicle based on a desired operation of the vehicle.

4. The control system of claim 3, wherein the monitoring module selects the first or the second operational parameter for controlling the vehicle based on the selected control module.

5. The control system of claim 1, wherein the first and the second operational ranges define at least one of a distance range, a velocity range, an acceleration range, a heading, and/or a yaw rate.

6. The control system of claim 1, wherein:

the first control module is further configured to receive data from a first sensor located with the vehicle for controlling the vehicle, the second control module is further configured to receive data from a second sensor located with the vehicle for controlling the vehicle, and the first and the second sensors are communicably connected to the ECU.

7. The control system of claim 6, wherein the first and the second sensors are the same sensor.

8. The control system of claim 6, wherein the first sensor is different from the second sensor.

9. The control system of claim 6, further comprising at least one of the first and the second sensor.

10. The control system of claim 6, wherein at least one of the first and the second sensors are one of a radar, a LiDAR sensor, an ultrasonic sensor, or a camera.

11. A vehicle comprising the control system of claim 1.

12. The vehicle of claim 11, wherein the vehicle is a truck, a bus, a car, or a working machine.

13. The vehicle of claim 11, wherein at least one of a first and a second sensor is located with the vehicle.

14. A computer implemented method for selectively controlling operation of a vehicle using a control system, wherein the control system comprises:

an electronic control unit (ECU) comprising:

a first control module configured to control the vehicle within a first operational range, a second control module configured to control the vehicle within a second operational range, the second control module redundant to, separate from, and executed in parallel to the first control module, the first operational range being a subset of the second operational range and a monitoring module adapted to monitor the operation of the vehicle and select between the first control module and the second control module for controlling the vehicle, the method comprises:

comparing, using the monitoring module, the operation of the vehicle with the first operational range, selecting, using the monitoring module, the first control module over the second control module to control the vehicle if the vehicle is operated within the first operational range, and selecting, using the monitoring module, the second control module over the first control module to control the vehicle if the vehicle is operated outside of the first operational range.

15. The method of claim 14, wherein the second control module is only selected if the vehicle is operated inside of the second operational range.

16. The method of claim 14, wherein the first and the second control modules are adapted to generate corresponding first and second operational parameters, and the method further comprises the step of:

controlling the vehicle using the first or the second operational parameters based on the selected control module.

17. The method of claim 14, wherein the first and the second operational ranges define at least one of a distance range, a velocity range, an acceleration range, a heading, or a yaw rate.

* * * * *